US010999536B2

(12) United States Patent
Rud et al.

(10) Patent No.: US 10,999,536 B2
(45) Date of Patent: May 4, 2021

(54) EXPLOSION-PROOF THERMAL IMAGING SYSTEM

(71) Applicant: Rosemount Inc., Shakopee, MN (US)

(72) Inventors: Jason H. Rud, Mayer, MN (US); Andrew J. Kitzman, Chandler, AZ (US); Sascha Ulrich Kienitz, Munich (DE)

(73) Assignee: Rosemount Inc.

( * ) Notice: Subject to any disclaimer, the term of this patent is extended or adjusted under 35 U.S.C. 154(b) by 368 days.

(21) Appl. No.: 14/755,094

(22) Filed: Jun. 30, 2015

(65) Prior Publication Data

US 2017/0006237 A1 Jan. 5, 2017

(51) Int. Cl.
*H04N 5/33* (2006.01)
*H04N 5/225* (2006.01)
*G01J 5/04* (2006.01)
*G01J 5/52* (2006.01)
*G01J 5/00* (2006.01)
*G01J 5/06* (2006.01)

(52) U.S. Cl.
CPC ............. *H04N 5/33* (2013.01); *G01J 5/044* (2013.01); *G01J 5/048* (2013.01); *G01J 5/522* (2013.01); *H04N 5/2252* (2013.01); *G01J 2005/0051* (2013.01); *G01J 2005/0077* (2013.01); *G01J 2005/068* (2013.01); *H04N 2005/2255* (2013.01)

(58) Field of Classification Search
CPC ......... H04N 2005/2255; H04N 5/2252; H04N 5/33; G01J 2005/0077; G01J 2005/0048
USPC .......................................................... 348/82
See application file for complete search history.

(56) References Cited

U.S. PATENT DOCUMENTS

2006/0232675 A1  10/2006  Chamberlain et al.
2010/0329306 A1  12/2010  Carlson et al.
2011/0241876 A1*  10/2011  Kearney ............ G06K 7/10544
                                               340/540

(Continued)

FOREIGN PATENT DOCUMENTS

JP    2001057642 A    2/2001
WO    2014006500 A2   1/2014

OTHER PUBLICATIONS

International Search Report and Written Opinion for International Patent Application No. PCT/US2016/037803, dated Oct. 17, 2016, date of filing: Jun. 16, 2016, 14 pages.

(Continued)

*Primary Examiner* — Jamie J Atala
*Assistant Examiner* — Kathleen V Nguyen
(74) *Attorney, Agent, or Firm* — Christopher R. Christenson; Kelly, Holt & Christenson PLLC

(57) ABSTRACT

An explosion-proof thermal imaging system is provided. The system include an explosion-proof housing having a window that is configured to allow thermal radiation therethrough. An infrared camera is positioned within the explosion-proof housing and is disposed to receive and image thermal radiation that passes through the window. An emissivity target is disposed within a field of view of the infrared camera, but on an opposite side of the window from the infrared camera. A temperature sensor is operably coupled to the infrared camera and is configured to provide an indication of temperature proximate the emissivity target.

16 Claims, 4 Drawing Sheets

(56) References Cited

U.S. PATENT DOCUMENTS

| | | | | |
|---|---|---|---|---|
| 2012/0072147 A1* | 3/2012 | Lee | ................. | F23N 5/082 |
| | | | | 702/64 |
| 2013/0147966 A1* | 6/2013 | Kostrzewa | ........... | H04N 5/3655 |
| | | | | 348/164 |
| 2013/0161513 A1* | 6/2013 | Nikittin | .................. | G01J 5/048 |
| | | | | 250/330 |
| 2014/0232875 A1* | 8/2014 | Boulanger | ........... | H04N 5/3651 |
| | | | | 348/164 |
| 2016/0161441 A1* | 6/2016 | Reiter | .................... | G01N 27/40 |
| | | | | 204/415 |

OTHER PUBLICATIONS

IRCamSafe EX-AXB/C—Automation Technology Vision Systems for Automation—4pgs.
First Chinese Office Action dated Sep. 29, 2018, for Chinese Patent Application No. 201610197055.5, 26 Pages including English translation.
Office Action dated Dec. 18, 2019 for the Japanese Patent Application No. 2017-567624, 11 pages including English translation.
Extended Search Report dated Jan. 23, 2019, for European Patent Application No. 16818450.5, 8 pages.
Second Office Action dated Jul. 2, 2019 for Chinese Patent Application No. 201610197055.5, pp. 22, including English translation.
Communication Pursuant to Article 94(3) for European Application No. 168181450.5, dated Feb. 9, 2021, 6 pages.

* cited by examiner

EXPLOSION-PROOF THERMAL IMAGING SYSTEM

BACKGROUND

Infrared cameras generally form an image using infrared radiation, similar to the way in which a standard camera forms an image using visible light. However, an infrared camera typically operates with longer wavelength illumination, such as 14,000 nanometers. Infrared cameras are highly useful in a number of applications to provide a non-contact indication of heat present in an image field. Moreover, the infrared cameras, in some contexts, can be calibrated such that an indication of surface temperature can be derived directly from the image provided by the infrared camera.

One environment in which infrared cameras are particularly useful is in process control and monitoring. In such environments, process fluids, such as petrochemicals, slurries, pharmaceutical compounds, and the like may be processed and conveyed to various locations within the processing facility. However, process control and monitoring environments represent a challenge for a number of devices in that the environment itself may have highly flammable or explosive gases present therein. Accordingly, in some such environments, it is important for electronic devices used therein to be housed in an explosion-proof enclosure. When so housed, even if the circuitry of the device generates a spark or has an electrical component with a surface temperature high enough to ignite the environment, the resulting ignition will be entirely contained within the enclosure and not able to escape into the ambient environment. This is important in order to ensure safety of the process control installation and workers therein.

One example of an explosion-proof rating is an ATEX certification to Ex d standards EN60079-0 and EN60079-1 for potentially explosive atmospheres. Generally, explosion-proof housings are relatively bulky in order to be mechanically robust enough to contain an internal explosion without rupturing. Generally, such explosion-proof housings are very robust metal enclosures that are designed to withstand explosive pressures. However, for devices, such as infrared cameras that rely on optical sensing of the environment, the enclosure must accommodate a transparent window of some sort in order to allow the infrared camera to view the environment. Typical window materials used to allow infrared energy to pass through are fragile and cannot withstand much of any impact without some damage. However, in order to contain the explosive pressure and impact requirements, the window must be relatively thick. Further, in some applications, a guard of some sort must be placed in front of the window. This can be restrictive to the infrared energy. Accordingly, explosion-proof requirements for infrared cameras can limit the effectiveness of the infrared camera. Providing an infrared camera/explosion-proof housing assembly that is suited for hazardous process installations would represent an important advance in the use of infrared cameras in such installations.

SUMMARY

An explosion-proof thermal imaging system is provided. The system include an explosion-proof housing having a window that is configured to allow thermal radiation therethrough. An infrared camera is positioned within the explosion-proof housing and is disposed to receive and image thermal radiation that passes through the window. In some embodiments, a net guard is placed in front of the window to protect it in the event a projectile comes in contact with the device. An emissivity target is disposed within a field of view of the infrared camera, but on an opposite side of the window from the infrared camera. A temperature sensor is operably coupled to the infrared camera and is configured to provide an indication of temperature proximate the emissivity target. In some embodiments, this allows for compensation of the net guard in relation to the rest of the image.

DETAILED DESCRIPTION OF ILLUSTRATIVE EMBODIMENTS

When an infrared camera is used in a hazardous environment, it is typically, as set forth above, provided within an explosion-proof housing. Infrared technology requires an optical window that is made of special materials that can potentially be damaged if such materials experience a physical impact. Accordingly, in order to reduce the chances of the window experiencing such impact, a net guard or other physical structure is used to protect the infrared window of the housing from impacts. While such a net guard is useful in reducing or eliminating impacts, it can affect operation of the infrared camera. For example, the net guard can potentially block portions of the field of view of the camera and/or attenuate the infrared image. Further, the infrared window itself can become dirty, over time, or in response to a particular event or damage. This can lead to degradation in the measurement.

Embodiments of the present invention generally place a reference temperature sensor and emissivity target outside the window of the infrared camera, but within the field of view of the camera. In some embodiments, the reference temperature sensor is a resistance temperature device that is placed on the net guard in order to provide a reference temperature measurement point for the camera. Further, the temperature measurement from the RTD can be used to compensate for attenuation of the guard and the signal when it is affected by a potentially dirty lens or window and signal reduction from transmissivity effects of the window.

Figure 1:
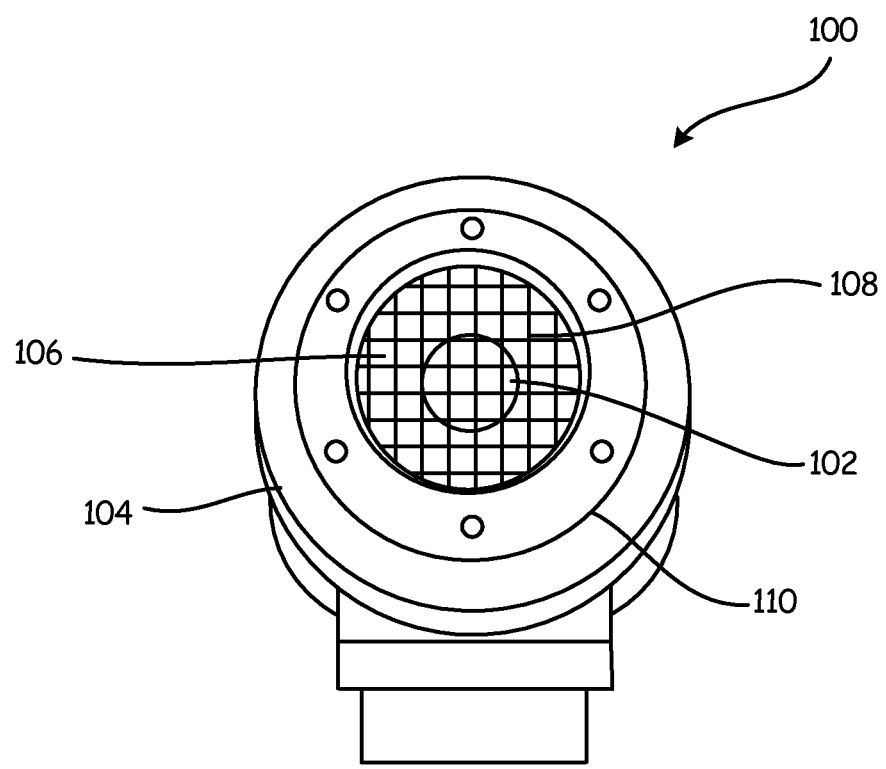
FIG. 1 is a diagrammatic view an industrial infrared camera housed within an explosion-proof housing in accordance with an embodiment of the present invention.

FIG. 1 is a diagrammatic view an industrial infrared camera housed within an explosion-proof housing in accordance with an embodiment of the present invention. Camera 100 includes infrared sensor 102 that includes a number of elements or pixels that are sensitive to thermal radiation having wavelengths longer than those of the visual spectrum. Sensor 102 is disposed within housing 104, which is generally formed of metal and designed to be able to withstand and contain an explosion therein. Accordingly, housing 104, in some embodiments, may comply with one or more explosion-proof ratings, such as that set forth above. Housing 104 includes an optical window 106 through which sensor 102 can receive infrared radiation. Optical window 106 is sized and formed of a material that is mechanically robust enough contain an explosion within enclosure 104, but which is sufficiently transparent to pass infrared radiation.

In some embodiments, window 106 is formed of a material that can be damaged if it experiences an impact from an object. Accordingly, camera 100 also includes net guard 108 disposed over window 106. Net guard 108, in the embodiment shown in FIG. 1, is formed of a number of crisscrossing wires that terminate in collar 110 which is bolted or otherwise secured to housing 104. Accordingly, objects which would otherwise impact object 106 instead impact net guard 108.

Figure 2:
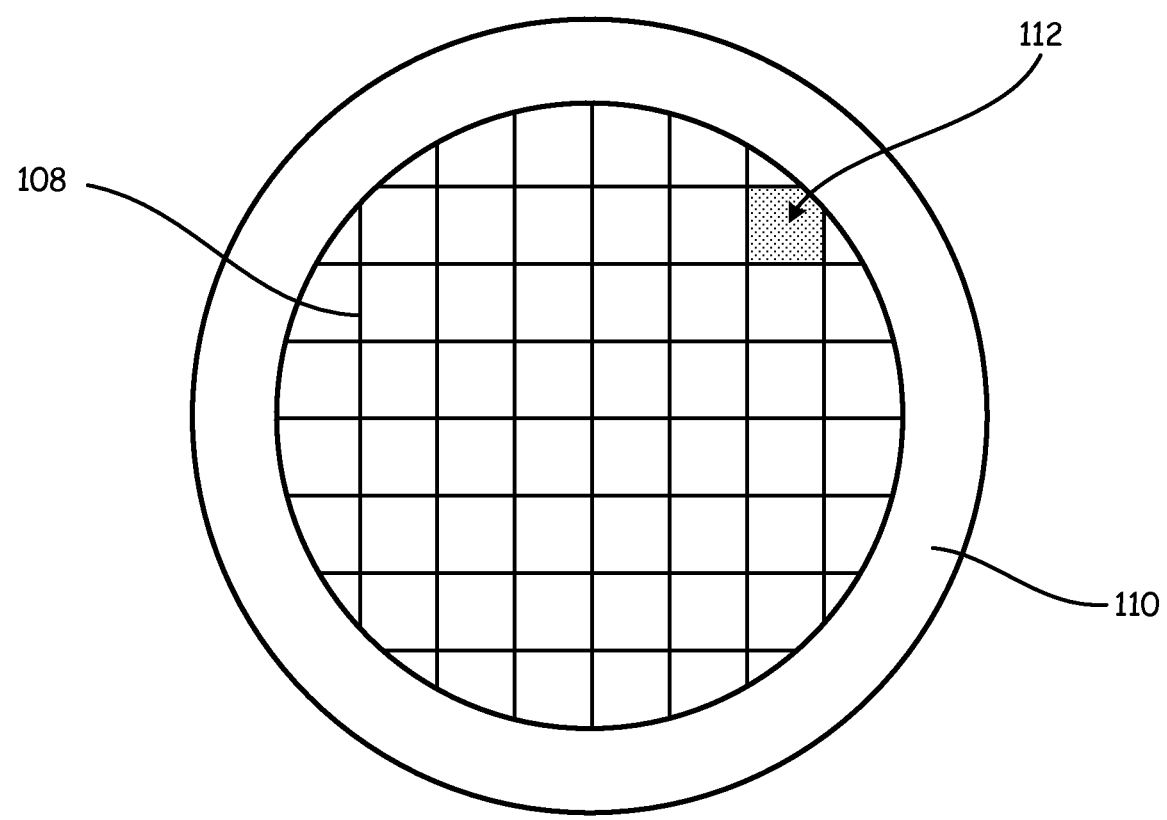
FIG. 2 is a diagrammatic view of a net guard having a high emissivity target in accordance with an embodiment of the present invention.

In accordance with an embodiment of the present invention, a temperature sensor 212 (shown in FIG. 3) is thermally coupled to or disposed within collar 110 or net guard 108. In this way, the temperature of the net guard and/or collar 110 can be measured. Alternatively, the temperature sensor 212 could be mounted on or integral with target 112. Additionally, as shown in FIG. 2, at least one cell of net guard 108 is occupied with a high emissivity reflective target 112. The emissivity of target 112 is chosen or otherwise known and is, in one embodiment, relatively high such that it can be effectively imaged even when window 106 becomes damaged or dirty. Further, by imaging emissivity target 112, and measuring the temperature of collar 110 or net guard 108, the infrared camera can be calibrated. This is because imaging target 112 with sensor 102 will provide an indication of the temperature of target 112. Then, physically measuring the temperature proximate target 112, using a temperature sensor disposed within collar 110, or net guard 108, will provide an indication of the degree to which the image-derived temperature deviates from the measured reference temperature. In one embodiment, target 112 includes or is coupled to a contact thermometer. The deviation between the temperature measured by the sensor or thermometer and the optically-derived measurement can be indicative of damage to window 106 or an indication that window 106 is becoming dirty. Thus, the infrared camera can adjust or otherwise compensate for such deleterious window effects and continue to function effectively. In other words, using a reference temperature sensor, such as temperature sensor 212, on net guard 108 creates a reference point for the camera and provides an additional temperature measurement reference from the temperature sensor in order to compensate for the attenuation of net guard 108 and the signal of a possible dirty lens. However, in situations where high emissivity target 112 is protected from contamination, the temperature evaluation can be performed without a separate measurement from a temperature sensor. This optically-derived value could then be used to offset any of the pixels that are seeing the net guard. Further, the uniformity of the image across the net guard can be measured or otherwise determined and used to provide an indication of how dirty window 106 is. Ideally, the image of the net guard would all be the same temperature or would follow a gradient profile in a normal condition. When window 106 is dirty, the profile would no longer be uniform or gradual. Regional measurements of the grid will appear like noise.

Figure 3:
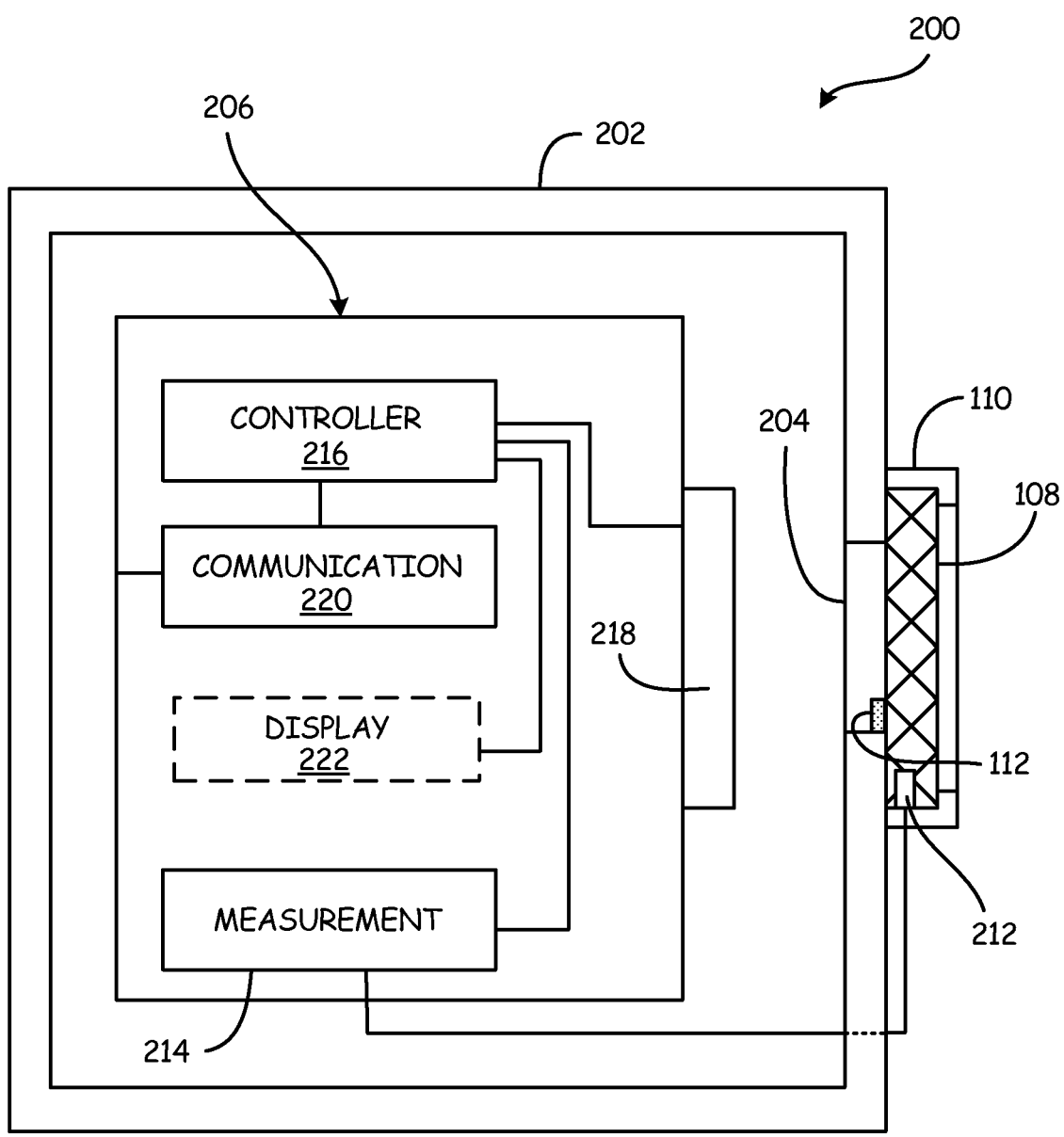
FIG. 3 is a diagrammatic view of an infrared camera disposed within an explosion-proof housing in accordance with an embodiment of the present invention.

FIG. 3 is a diagrammatic view of an infrared camera disposed within an explosion-proof housing in accordance with an embodiment of the present invention. System 200 includes an explosion-proof housing 202 having an explosion-proof optical window 204 that allows infrared camera 206 to view infrared radiation passing through window 204. Net guard 208 is disposed in front of window 204 in order to protect window 204 from impacts. Additionally, high emissivity target 210 and temperature sensor 212 are provided proximate net guard 208 or a collar surrounding net guard 208. Temperature sensor 212 is operably coupled to measurement circuitry 214 that, in one embodiment, is disposed within camera 206. While the embodiment shown in FIG. 3 indicates a direct physical coupling between temperature sensor 212 and measurement circuitry 214, embodiments of the present invention expressly contemplate the utilization of wireless methods in order to convey information indicative of the temperature to measurement circuitry 214. In particular, near field communication techniques can be used wherein electromagnetic energy is coupled through window 204 to a passive RFID structure coupled to the temperature sensor. The response of the passive RFID structure can indicate the temperature to measurement circuitry 214. This is particularly advantageous in that fewer intrusions through housing 202 would be required.

Infrared camera 206 includes controller 216 coupled to infrared sensor 218. In one example, infrared sensor 218 is a microbolometer. This structure is generally configured to receive infrared radiation with wavelengths between 7 and 14 micrometers that strike the detector material, heat it, and thus change its electrical resistance. The resistance change can be measured and processed into various temperatures in order to create an image. However, embodiments of the present invention can include any suitable structure for detecting thermal radiation passing through window 204. Controller 216 is configured to interact with infrared sensor 218 in order to generate a thermal image in accordance with known techniques. Additionally, controller 216 is coupled to communication circuitry 220 in order to convey the thermal image data to an additional device. For example, communication circuitry 220 can include wireless communication circuitry that is able to communicate in accordance with known wireless communication techniques and protocols, such as WIFI, Bluetooth, et cetera. Further, communication circuitry 220 can be configured to communicate in accordance with known process industry standard protocols, such as IEC62591 (WirelessHART®). Additionally, in some embodiments, camera 206 may include display module 222 that is configured to either generate a local display potentially viewable through another window (not shown).

In accordance with embodiments of the present invention, controller 216 is configured, through hardware, software, or a combination thereof, to cause measurement circuitry 214 to obtain an indication of net guard temperature via temperature sensor 212. Further, controller 216 is also configured to obtain a thermal image which contains, in its field of view, a portion corresponding to high emissivity target 210. Controller 216 images target 210 and generates a first thermal indication of high emissivity target 210 based on the image. Additionally, controller 216 also generates a thermal indication of high emissivity target 210 based on the temperature measured from temperature sensor 212. Then, contrasting the first thermal indication (derived from the thermal image) and the reference temperature (derived from the temperature sensor) controller 216 is able to determine the degree to which the two temperatures are different. This difference can indicate damage to the window. Further, the difference can also be used by controller 216 to obtain a calibration. Accordingly, applying this difference, controller 216 can generate compensated thermal images.

Dirt and or dust collecting on window 204 can result in changing the transmissivity of window 204 over time. If the infrared temperature has an offset in relation to the reference temperature, the user can receive a warning that the system has lost accuracy and that window 204 is dirty and needs to be cleaned. This indication can be provided in addition to or in place of the compensations described above. In one example, the detected transmissivity changes caused by relative humidity could be indicated if the offset should appear suddenly and relatively uniformly within the thermal image. Further still, reference temperature sensor 212 could also be used to provide information about ambient temperature in order to potentially trigger or otherwise initiate internal heating within housing 202.

Figure 4:
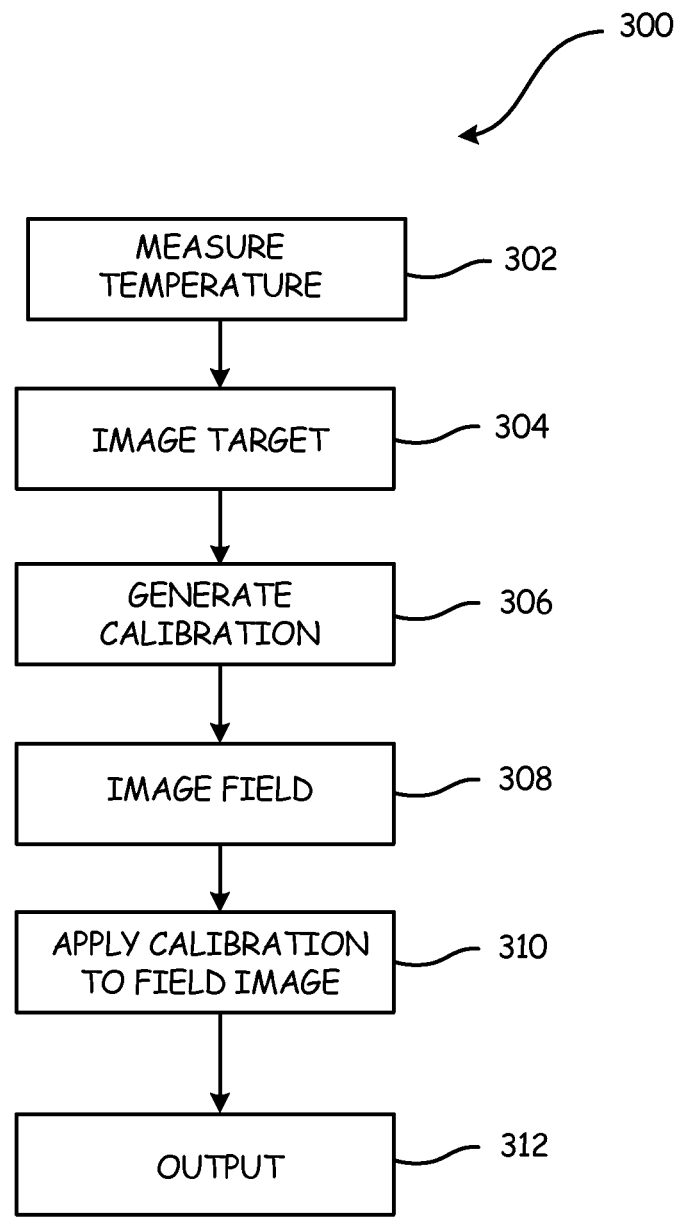
FIG. 4 is a flow diagram of a method of operating an infrared camera in a hazardous environment in accordance with an embodiment of the present invention.

FIG. 4 is a flow diagram of a method of operating an infrared camera in a hazardous environment in accordance with an embodiment of the present invention. Method 300 begins at block 302 where a temperature is measured external to an optical window that forms part of the explosion-proof housing of the infrared camera. As set forth above, this thermal indication can be generated by a temperature sensor mounted on a net guard or a collar surrounding and mounting the net guard. The temperature sensor can be any suitable device that is able to provide an electrical indication that corresponds to temperature. Examples of such devices include thermocouples, RTDs, thermistors, et cetera. The temperature measurement is preferably performed by the infrared camera itself, such as camera 206 with respect to FIG. 3. However, the temperature measurement could be performed by an external device and simply conveyed or otherwise communicated to the infrared camera. Next, at block 304, the infrared camera images a high emissivity target disposed outside of its explosion-proof housing. Imaging the high emissivity target generates an indication of the temperature of such high emissivity target. Next, at block 306, in one example, the infrared camera will use the difference between the measured temperature and the image-derived temperature of the high emissivity target to generate a calibration or diagnostic indication. At block 308, the infrared camera is engaged to image the field of view. This imaged field of view may be affected by damage to the optical window of the housing as well as the presence of dirt or dust on the optical window, or a combination thereof. Using the calibration obtained at block 306, method 300 allows the infrared camera to provide a compensated image, as indicated at block 310. However, the infrared camera, based on the degree of calibration being applied, can also provide a diagnostic indication potentially indicating damage to the optical window, and/or dirt or dust thereon. Finally, the calibrated field image is output as indicated at block 312. This output can be provided locally via a display of the camera, remotely via communication, such as wireless communication, or a combination thereof. Additionally, once the infrared camera is calibrated, an IR foil could be used that is replaced after a certain amount of time in order to keep dirt and/or dust off window 204 (shown in FIG. 3).

Although the present invention has been described with reference to preferred embodiments, workers skilled in the art will recognize that changes may be made in form and detail without departing from the spirit and scope of the invention.

What is claimed is:

1. An explosion-proof thermal imaging system comprising:
    an explosion-proof housing having a window that is configured to allow thermal radiation therethrough wherein the window is partially obscured by accumulated contaminate;
    a guard disposed in front of the window;
    an emissivity target disposed within the guard;
    an infrared camera positioned within the explosion-proof housing and configured to capture an image of the emissivity target and generate an image-based temperature thereof;
    a temperature sensor mounted to the guard and configured to sense a temperature proximate the emissivity target;
    a controller, operably coupled to the temperature sensor, configured to determine a level of contamination on the window indicative of the accumulated contaminate based on a comparison of the image-based temperature of the emissivity target with the sensed temperature from the temperature sensor, and generate calibration information based on the comparison of the image-based temperature with the sensed temperature and provide subsequent calibrated thermal imaging based on the calibration information; and
    wherein the controller is further configured to generate an output indicative of the level of contamination on the window based on the comparison of the image-based temperature with the sensed temperature.

2. The explosion-proof thermal imaging system of claim 1, wherein the window is formed of a material that is susceptible to damage from impacts.

3. The explosion-proof thermal imaging system of claim 1, wherein the temperature sensor is mounted to a collar that mounts the guard to the explosion-proof housing.

4. The explosion-proof thermal imaging system of claim 1, wherein the guard is a net guard formed of crisscrossing wires.

5. The explosion-proof thermal imaging system of claim 1, wherein the temperature sensor is operably coupled to measurement circuitry of the infrared camera.

6. The explosion-proof thermal imaging system of claim 5, wherein the temperature sensor is wirelessly coupled to the infrared camera.

7. The explosion-proof thermal imaging system of claim 1, wherein the infrared camera is configured to wireless communicate image data to a remote device.

8. The explosion-proof thermal imaging system of claim 7, wherein the wireless communication is in accordance with a wireless process industry standard protocol.

9. The explosion-proof thermal imaging system of claim 1, wherein the infrared camera includes a microbolometer.

10. The explosion-proof thermal imaging system of claim 1, wherein the controller is configured to engage a heater of the housing based on the indication of temperature proximate the emissivity target.

11. The explosion-proof thermal imaging system of claim 1, wherein the housing complies with an explosion-proof rating.

12. The explosion-proof thermal imaging system of claim 1, wherein the emissivity target and the temperature sensor constitute an integral unit.

13. The explosion-proof thermal imaging system of claim 1, wherein the temperature sensor is mounted to the emissivity target.

14. A method of operating a thermal imaging system in a hazardous environment, the method comprising:
    placing an infrared camera in an explosion-proof housing having an impact guard disposed in front of a window and orienting the infrared camera to view through the window of the housing;
    causing the infrared camera to image an emissivity target, disposed within the impact guard in front of the window and protected from contamination, and determine an optically-derived value of the emissivity target based on the image;

sensing a temperature proximate the emissivity target using a temperature sensor;

determining a level of contamination on the window indicative of accumulated contaminate based on a comparison of the optically-derived value of the emissivity target with the sensed temperature from the temperature sensor;

generating calibration information based on the comparison of the optically-derived value with the sensed temperature;

generating an output indicative of the level of contamination on the window based on the comparison of the optically-derived value with the sensed temperature; and providing subsequent calibrated thermal images based on the calibration information.

15. An explosion-proof thermal imaging system comprising:

an explosion-proof housing having a window disposed adjacent an impact guard, the window being configured to allow thermal radiation therethrough wherein the window is partially damaged from a physical impact;

an infrared camera positioned within the explosion-proof housing and disposed to receive and image thermal radiation that passes through the window;

an emissivity target disposed on the impact guard on an opposite side of the window from the infrared camera, but within a field of view of the infrared camera;

wherein the infrared camera is configured to image the emissivity target and determine an image-based temperature of the emissivity target based on the image, and wherein the system is configured to provide a diagnostic indication, relative to a level of damage of the window, based on a comparison of the image-based temperature to a sensed temperature from a temperature sensor located on the impact guard; and wherein the system is further configured to generate an output indicative of the level of damage of the window based on the comparison of the image-based temperature with the sensed temperature.

16. The explosion-proof thermal imaging system of claim 15, wherein the system is configured to provide an indication relative to the window based on uniformity across the net guard.

* * * * *